United States Patent Office 3,401,747
Patented Sept. 17, 1968

3,401,747
METHOD OF SEALING FISSURES IN
EARTHEN FORMATIONS
Albert W. Coulter, Jr., and Claude T. Copeland, Tulsa, Okla., assignors to The Dow Chemical Company, Midland, Mich., a corporation of Delaware
No Drawing. Filed Mar. 13, 1967, Ser. No. 622,386
12 Claims. (Cl. 166—33)

ABSTRACT OF THE DISCLOSURE

A method of grouting and of plugging openings, e.g. passageways, fissures, cracks, and the like, in the earth which comprises emplacing in such opening a fluid, settable resinous composition comprising an epoxide-acrylate polymer, or preferably such polymer in admixture with up to 75% by weight of monomeric styrene, and more preferably also with a small but effective amount of a selected silane to provide a bonding agent between the resin and the earth, and allowing the so emplaced composition to set to a substantially fluid-tight firmly emplaced solid resistant to the movement of fluids therethrough.

---

A present area or field of endeavor centers about providing acceptable seals against the unwanted seepage of fluids through earthen or rock formations which comprise the confining formation walls of underground cavities, e.g., storage space or reservoirs, boreholes, excavations, and test caverns for explosives and the like.

A problem which has contributed to the need for such endeavors is exemplified by the existence of leaks and seepage of gases and/or liquids either into or from such cavities. Paticular problems have been associated with narrow cracks or fissures in the fomation, particularly when an appreciable pressure difference exists as between fluids in storage such as ammonia or heating and cooking gas where the stored gas is under lower pressure than the relatively higher pressure that exists beyond the confining walls. Upon occasion, the stored gas may be under higher pressure than that which exists beyond the confining walls. The problem is more acute where the offending fissures are narrow, to which reference is sometimes made as fineline or hairline fractures. This problem heretofore has escaped satisfactory solution.

The invention is concerned with this problem. Failure to solve the problem has been partly due to the heretofore unsuccessful search for a material having all the necessary properties for emplacement into these fissures to provide such plugs. The material, to be fully satisfactory, must have a relatively low viscosity during emplacement, but yet remain emplaced as desired without objectionable loss, gy oozing away, until it ultimately gels, which it must do within a reasonable lapse of time, to a firm solid without accompanying undue shrinkage. It must be durable, i.e. resistant to erosion and corrosion. Without these characteristics, it is unacceptable for many of the plugging needs.

We have discovered that a vinyl resin composition obtained by reaction of an unsaturated carboxylic acid with a polyepoxide, which contains ethylenically unsaturated groups and which advantageously is blended with monomeric styrene and readily converted to a thermoset resin by admixture therewith of an amine and, when the styrene is present, with a free radical yielding-catalyst, (preferably at an advanced temperature) can be emplaced as a fluid in an opening, e.g. fracture, crevice, or void in an earthen formation, where it hardens to form a tight seal against the passage of fluids along or through the opening.

The invention, broadly, is an improved grouting or plugging process by which a fluid-tight seal is provided in openings of various sizes and shapes in the earth.

Methods of preparing resins suitable for use in the practice of the invention are described in U.S. patent applications S.N. 605,603 filed December 29, 1966; S.N. 600,788 filed December 12, 1966; and S.N. 597,233 filed Nov. 18, 1966. An acceptable resin may also be prepared according to U.S. Patents 3,066,112 and 2,826,562.

For S.N. 605,603, vinyl ester resins are prepared by reacting a polyglycidyl ether of a polyhydric phenol or mixtures thereof with an alpha, beta-unsaturated monocarboxylic acid wherein the average epoxide $n$ value of the polyepoxide or mixture ranges from 0.2 to 2.0, subsequently cured by known epoxide crosslinking agents.

In S.N. 600,788, resin compositions are prepared by reacting an unsaturated carboxylic acid and a polyepoxide with an unsaturated polyester and subsequently curing the resin with known crosslinking agents.

In S.N. 597,233, resin compositions are made by reacting a polyepoxide with an ethylenically unsaturated monocarboxylic acid, wherein secondary hydroxyl groups are formed by the epoxide-carboxylic acid interaction and thereafter reacting a dicarboxylic acid anhydride with the resin composition. The presence of a polymerizable monomer, e.g. styrene, is recommended.

The unsaturated acid preferably employed in the preparation of the resin is either acrylic acid, methacrylic acid, or a mixture thereof.

One embodiment of the invention employs monomeric styrene with the above described resinous material, the styrene being used in amounts up to 60 percent by weight of the unsaturated carboxylic acid-polyepoxide resin mixture.

Among the preferred peroxides to employ in the preparation of the resin required by the invention are benzoyl peroxide, methyl ethyl ketone peroxide, cumene hydroperoxide, or mixtures thereof.

Among the preferred curing agents to effect crosslinking are primary, secondary, or tertiary aliphatic and/or aromatic amines. N,N'-dimethylaniline is illustrative of an amine so used.

A preferred embodiment of the invention employs both a peroxide and an amine to effect cure of the resin containing a vinyl monomer such as styrene. A 25 to 75 weight ratio, e.g. 50:50 is commonly used.

The resin required to be used in the practice of the invention exhibits high resistance to chemical attack and accordingly when subjected to the action of sulfuric acid, nitric acid, bleaching agents, aqueous solutions of sodium hydroxide or the like, it retains its sealing properties. It is resistant in a practical sense to being solubilized or otherwise dislodged by continued contact with underground fluids.

The composition required for the invention has a desirably low viscosity, usually less than about 30 centipoises at 25° F.

The composition employed in the invention also permits a satisfactory working time for preparation and emplacement. Working time as used herein, is the elapsed time, measured as the time between admixture of the ingredients and gelation to the extent that the mixture cannot be moved satisfactorily. It may be varied from between about 5 minutes and about 4 hours, dependent upon the type and amount of peroxide and/or amine present and the ambient temperature.

The following descriptive material is directed principally to the use of acrylic or methacrylic acid as the unsaturated carboxylic acid employed. Such acid is illustrated, however, and not to be construed as limiting.

The diphenol-glycidyl methacrylate or acrylate resin, as illustrative, for use in the invention may be prepared by known procedures. The following is an example: p,p'- isopropylidenediphenol is admixed with glycidyl methacrylate or glycidyl acrylate or mixture of both in a molar ratio of the diphenol to the methacrylate and/or acrylate of at least 0.5, in the presence of from about 0.5 to 1.0 percent, by weight of monomers, of a tertiary amine, e.g., dimethylamine-p-toluene. The reaction may be conducted at any convenient moderate temperature, e.g., from 30° C. to 90° C., 50° C. to 65° C. being commonly employed. During the reaction, the oxygen bridges of the oxirane groups are broken and new bonds are formed. The reaction, when glycidyl methacrylate is employed, may be represented by the following reaction preferably carried out under a nitrogen gas blanket at between about 40° C. and 70° C. and containing the necessary small but effective amount of a tertiary amine:

A further embodiment of the invention employs a bonding agent for forming highly tenacious bonds between the resin and the rock or earth in contact therewith. The preferred bonding agent is that described in U.S. Patent 3,258,477 of Plueddemann and Clark. The bonding agent may be described as that having a formula:

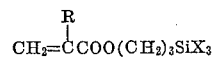

wherein R is selected from the group consisting of H and the methyl radical and X is a hydrolyzable group. Hydrolyzable, as herein used, means the group reacts with water under normal conditions for converting silanes to hydrolyzates. X, therefore, can be any halogen, a silicon nitrogen such as Me$_2$N— or EtN—; it can be methoxy,

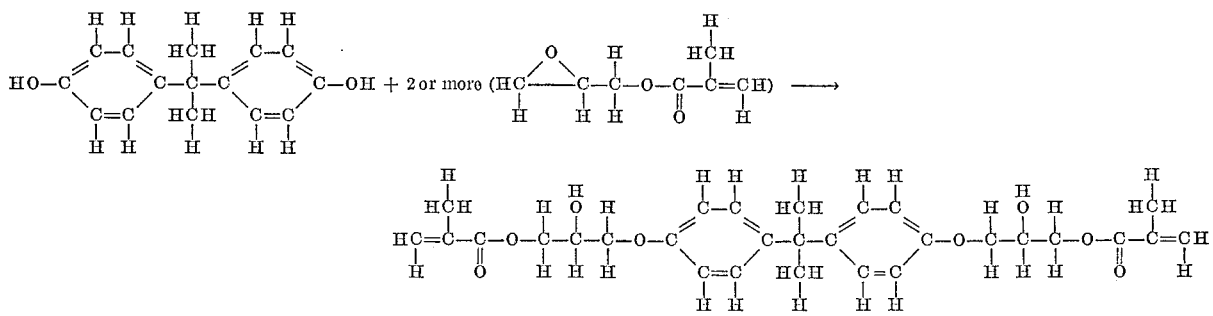

In general, a suitable resin for use in the invention can be prepared as follows:

Methacrylic or acrylic acid, or mixture of both, and a liquid epoxy resin, or solid epoxy resin dissolved in a suitable organic solvent e.g. toluene (the diglycidyl ether of p,p'-isopropylidenediphenol being such epoxy resin) are admixed at a temperature between about 20° C. and 150° C. (preferably between about 100° C. and 110° C.) in a molar ratio of about 0.8 and 1.2, in the presence of styrene, if desired and an inhibitor to polymerization of the vinyl groups, e.g. hydroquinone, and in the presence of a catalyst to ester bond formation between —COOH and

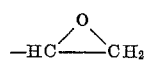

groups, e.g. DMP 30. Later, if desired, benzoyl peroxide or the similar free radical catalyst may be added. The resin so made may be subsequently cured by a peroxide and an amine.

Suitable resins for use in the practice are those sold under the trademark Derakane, available from The Dow Chemical Company, Midland, Mich., with or without monomeric styrene therein, as specified in accordance with the preference of the user.

Another suitable resin of the type prepared as described above for use in the practice of an invention is that available under the trademark Epocryl Resin E-11. This resin is also optionally available as a mixture with monomeric styrene. For example, a 50:50 weight ratio of resin to monomeric styrene is available under the designation of Epocryl E-11-S-50 as described in "Development Production R&D-6" (June 1965), published by The Shell Chemical Company, Plastics and Resins Division, Resin Development Department, 110 E. 51st St., New York, N.Y. The monomeric styrene lowers the viscosity of the resin appreciably. Epocryl E-11-S-50 has a specific gravity of about 1.020 and a viscosity of only about 16 centipoises at 25° C. This low viscosity is usually an excellent characteristic for a material useful for sealing fineline fractures. However if this viscosity is less than is desired, a lower content of styrene (or none) will provide a resin with a much higher viscosity. The viscosity of the resin, if desired, can be readily increased by admixing known additives therewith such as finely divided silica, carbon or the like.

ethoxy, butoxy, isopropoxy; it can be —OCH$_2$CH$_2$OH, or –(OCH$_2$CH$_2$O)$_n$Y where Y is an aliphatic hydrocarbon radical of 1 to 4 atoms; it can be phenoxy, cresyloxy or the radical having the configuration:

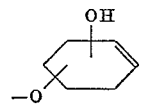

or or it can be acetoxy or a group containing Me$_2$C—N— or a sulfate group such as

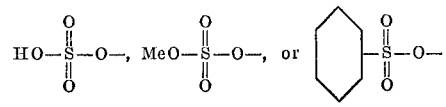

The following examples are illustrative of the practice of the invention.

EXAMPLE 1

An epoxy acrylic resin (Epocryl E-11-S-50) in an amount of 100 parts by weight, prepared by reacting one mole of p,p'-isopropylidenediphenol with glycidyl methacrylate in 1:2 mole proportions was admixed with 1.2 parts by weight of N,N'-dimethylaniline, 1 part of a 50:50 by weight solution of benzoyl peroxide in dibutylphthalate, and 1 part of the organosilane having the formula CH$_2$=CHOO(CH$_2$)$_3$Si(OMe)$_3$, accompanied by thorough stirring. The composition so made was injected at 50° F. into capillary tubes having an inside diameter of 2 millimeters. The material had a working time of 15 minutes. An additional time of 15 minutes (beyond the working time) was allowed for it to become solid, viz, 30 minutes in all. The compositions thus solidified in the tubes were tested by subjecting them to anhydrous ammonia at up to 95 pounds per square inch pressure. In no instance did the resin pull away from the sides of the retaining capillary tube upon completion of successive stage treatments.

EXAMPLE 2

The above example was repeated employing varying amounts of the benzoyl peroxide (dissolved in dibutylphthalate) and dimethylaniline. All the compositions so made were allowed to gel and set. They were then tested and showed that they provided a resistant seal to the passage of ammonia gas. The tests of the seals showed that the higher the amounts of the benzoyl peroxide and/or dimethylaniline employed, or the higher the temperature during gel, the shorter the gel time. The ultimate strength however did not seem to be greatly affected by the length of gel time.

1% of the compound having the formula

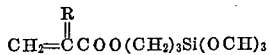

was admixed with additional samples of the resin. When the so modified material was tested similarly to the tests above, with ammonia gas, superior bonds were shown to exist between the set resin and the glass walls.

EXAMPLE 3

The extent of shrinkage of the composition employed by the invention was determined by placing the fluid resin of the type employed above, in a graduate, allowing it to gel and set to a solid, and thereafter determining the difference between the volume of the set resin and that of the fluid resin. The amount of shrinkage was very small, showing not more than 10 percent, either with or without the silane composition present. This amount of shrinkage is not objectionable.

EXAMPLE 4

An epoxy-methacrylate acid resin was prepared according to S.N. 605,603 containing about 50 percent by weight monomeric styrene, based on the weight of the epoxy resin and methacrylic acid. The epoxy resin was DER 331, a glycidyl ether of isopropylidenediphenol having an epoxide equivalent weight of about 190. The epoxy resin was present in a ratio of about 2 moles per mole of the methacrylic acid. An inhibitor to the reaction of the vinyl groups of the styrenes was present.

The above resin was admixed with 1.2 parts (per 100 parts of the resin) by weight of N,N'-dimethylaniline and 1 part by weight of benzoyl peroxide (previously dissolved in dibutylphthalate and 1 part of by weight of the organosilane having the formula

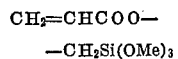

accompanied by thorough mixing.

The composition so made was injected into a capillary tube having an inside diameter of 2 millimeters. The composition had a working time of 10 minutes. A total curing time (10 minute working time plus an additional 10 minute period in the tube) was allowed, at room temperature, after which it was tested by subjecting the resin to 100 p.s.i. of air. No leakage of air occurred at this pressure.

EXAMPLE 5

The above example was repeated following the exact procedure except that the resin contained a lesser amount of styrene. The best results were the same as above.

EXAMPLE 6

A cavern near Sinclair, Wyo., was to be used for the storage of illuminating gas (of a type generally referred to as LPG). The cavern had a depth of about 400 feet and was located in a frontier shale formation. Seepage was observed to be occurring at a moderate but objectionable rate from three different fissures opening into the cavern through the cavern wall within a relatively small area. An epoxy-methacrylic resin was prepared similarly to the procedure followed in Example 1. To this was admixed 1 part by weight, per 100 parts of resin, of

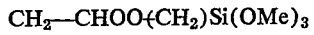

to improve the bonds between the resin and the formation surfaces.

A small hole was drilled into the formation wall for each fissure, at an angle which intercepted the fissure at a point several feet from the face of the formation. The fissures were plugged successively as follows:

Two supply drums were provided, each having a valve-controlled pipe leading from the bottom through a proportioning pump (to provide a means for maintaining the desired percent by volume mixture from the two drums). The pipes came together at a mixing T positioned opposite the area of the face of the formation where the fissure to be plugged opened into the cavern. A common pipe, led from the T into the hole drilled (as described above), said pipe at the place of entry was provided with a packer to prevent the fluid resin being injected from objectionally oozing back out of the hole.

The resin mixture containing the silane bonding agent was divided into two substantially equal portions, one of which was placed in one of the supply drums and the other portion into the other drum. 1.2 parts by weight of N,N-dimethylaniline, per 100 parts of resin composition, were admixed with the resin in one drum and 1 part of a 50:50 by weight mixture of benzoyl peroxide in dibutylphthalate were admixed with the resin in the other drum. The pump was started and the resin, in an amount of each, to provide about a 50:50 proportion, from each supply drum, pumped into the fissure as a grout and sealant at the rate of 1 gallon per 5 minutes at an injection pressure of about 400 p.s.i. After injection had been conducted for a time, resin was noticed to exude a distance of 12 feet from the point of injection (at a point, formerly undetected, where spur of the fissure entered the formation), indicating good distribution of the resin along the fissure and its branches entering the cavern. Pumping was continued for a total period of about 20 minutes. Within about 40 minutes time, after pumping was started, the resin was noted to be converted to a hard firm solid. The flow of water in the fissure was observed to be substantially completely shut off.

The process was repeated for each of the three fracture patterns in the formation area where water was seeping into the cavern. A total of approximately 8 gallons of the mixed resin from the two containers was pumped into each of the troublesome fissures following the same procedures as in the grouting process described above. After the thus injected resin had solidified in all three crevices, the flow of water was found to have descreased to an amount of between about 10 to 15 percent of the flow that existed prior to treatment.

Either of the two general types of leakage, i.e. one through a relatively large gap or fissure leading into a cavern or one through a hairline fissure, represents a different plugging job requiring judicious adjustments in the resin corporation within the spirit and scope of the invention. The composition used in the invention provides a wide range of successful sealing operations.

Although some advantage is to be derived by employing two sources of supply for the two supplemental resin systems, as in the treatment described above, excellent results may also be obtained by using one source wherein both the pexoxide and the amine are admixed in the same supply source provided that the ratio of peroxide to amine is selected to give a working time that is adequate to allow all of the grout to be placed in a formation.

Having described our invention, what we claim and desire to protect by Letters Patent is:

1. The method of sealing fissures, fractures, and the like in terranean formations comprising injecting into such a fissure, fracture or the like a fluid settable resin composition comprising an ester of a carboxylic acid containing ethylenically polymerizable groups and an epoxide, prepared by reacting an epoxide having an oxirane functionality of more than 1 with a molar excess of the acid, in the presence of a catalytic amount of a tertiary amine and having admixed therewith, subsequent to the ester formation to provide a settable resin between about 0.5 and 5.0 parts by weight, per 100 parts of the ester so made of a hardening agent for such resin selected from the class consisting of catalysts and reactants that effect crosslinking through the epoxide or hydroxyl groups and emplacing the settable resin so made, while in a fluid form, in the fissure, fracture or the like to be sealed and allowing the so emplaced resin to harden to a firm solid seal which inhibits the passage of fluids therethrough.

2. The method according to claim 1 wherein up to 75 percent by weight, based on the weight of carboxylic acid and epoxide present, of a vinyl monomer copolymerizable with the ethylenic groups of the acid and an effective amount of an inhibitor to inhibit polymerization through vinyl groups, is admixed therewith prior to admixing said hardening agent therewith and thereafter admixing an effective amount of a free-radical promoting catalyst to effect polymerization through vinyl groups is admixed with the composition at about the same time as said hardening agent is admixed therewith.

3. The method according to claim 2 wherein said vinyl monomer is styrene, wherein said inhibitor is hydroquinone, and said catalyst subsequently added to effect polymerization through vinyl groups is an oxygen-yielding compound selected from the class consisting of peroxide, hydroperoxides, and persulfates.

4. The method according to claim 1 wherein the carboxylic acid is selected from the class consisting of acrylic acid, methacrylic acid and mixtures thereof.

5. The method according to claim 1 wherein said hardening agent is an amine.

6. The method according to claim 1 wherein the resin composition is that prepared by first reacting p,p'-isopropylidenediphenol with a mole excess of epichlorohydrin and then admixing the epoxy resin so made with a monomeric acid selected from acrylic acid, methacrylic acid, and mixtures thereof in amounts to provide a molar ratio of at least about 2 carboxyl groups per epoxide group, in the presence of about 0.1 to about 1.0 part, per hundred parts by weight of the resin composition, of a tertiary amine at a temperature of between about 30° and 90° C. and thereafter, just prior to emplacing the resin composition in said fissure, fracture, or the like, admixing an amine crosslinking agent with said resin composition.

7. The method according to claim 1 wherein the resin composition is prepared by reacting p,p'-isopropylidenediphenol with a molar excess of epoxy compound selected from the class consisting of glycidyl acrylate, glycidyl methacrylate, and mixtures thereof and subsequently admixing an amine hardening agent therewith prior to emplacement of the settable resin in the fissure, fracture, or the like.

8. The method according to claim 7 wherein monomeric styrene is admixed with said resin composition, up to 75 percent by weight thereof, together with an inhibitor to polymerization through the vinyl groups, and wherein a peroxide is admixed with the resulting resin mixture in sufficient amount just prior to emplacement, to effect such polymerization after emplacement.

9. The method according to claim 1 wherein a thickening agent is admixed with said composition prior to emplacement in said fissure, said agent being selected from the class consisting of pulverulent silica, calcium carbonate, pumice, fuller's earth, bentonite, and paraformaldehyde.

10. The method according to claim 1 wherein an effective amount of an agent for improved bond strength between the emplaced resin and faces of the rock and earthen formation in contact therewith is admixed therewith prior to such contact, said agent being an alkoxy silane.

11. The method according to claim 10 wherein said alkoxy silane is beta - methacryloxypropyltrimethoxy silane.

12. The method according to claim 10 wherein said alkoxy silane has the generic formula $$CH_2=\overset{R}{\underset{|}{C}}COO(CH_2)_3SiX_3$$

wherein R is selected from the group consisting of H and the methyl radical and X is a hydrolyzable group. Hydrolyzable, as herein used, means the group reacts with water under normal conditions for converting silanes to hydrolyzates. X, therefore, can be any halogen, a silicon nitrogen such as Me$_2$N— or EtN—; it can be methoxy, ethoxy, butoxy, isopropoxy; it can be —OCH$_2$CH$_2$OH or —(OCH$_2$CH$_2$O)$_n$Y where Y is an aliphatic hydrocarbon radical of 1 to 4 atoms; it can be phenoxy, cresyloxy or the radical having the configuration:

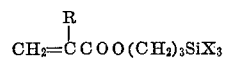

it can be acetoxy or a group containing Me$_2$C=NO— or

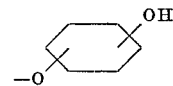

or Et$_2$C=N— or a sulfate group such as

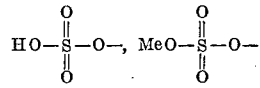

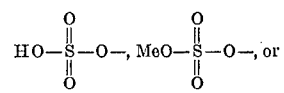

References Cited
UNITED STATES PATENTS

| | | | |
|---|---|---|---|
| 2,670,048 | 2/1954 | Menaul | 166—33 |
| 2,826,562 | 3/1958 | Shokal | 260—58 |
| 2,946,701 | 7/1960 | Pleuddemann. | |
| 3,066,112 | 11/1962 | Bowen | 260—41 |
| 3,170,516 | 2/1965 | Holland et al. | 166—33 X |
| 3,237,690 | 3/1966 | Karp et al. | 166—33 X |
| 3,316,966 | 5/1967 | Dear | 166—33 |

STEPHEN J. NOVOSAD, *Primary Examiner.*